March 26, 1940.  P. J. BILLIG  2,195,074
FUEL TANK FOR AIRPLANES
Filed Feb. 8, 1937
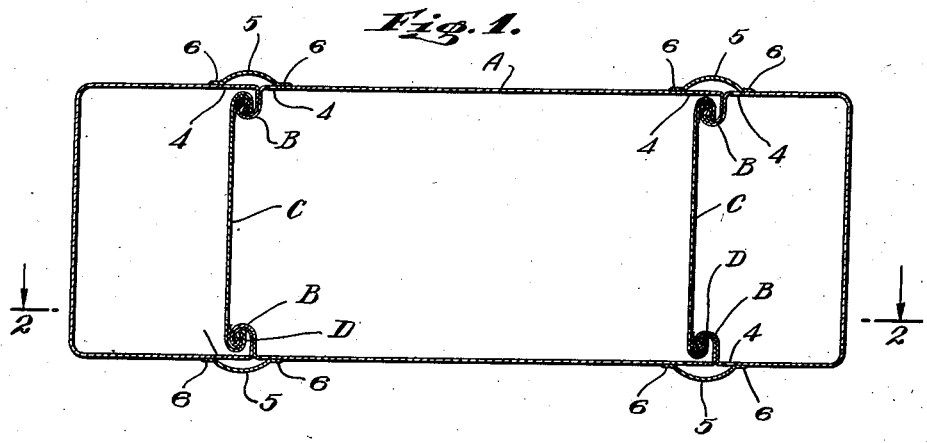
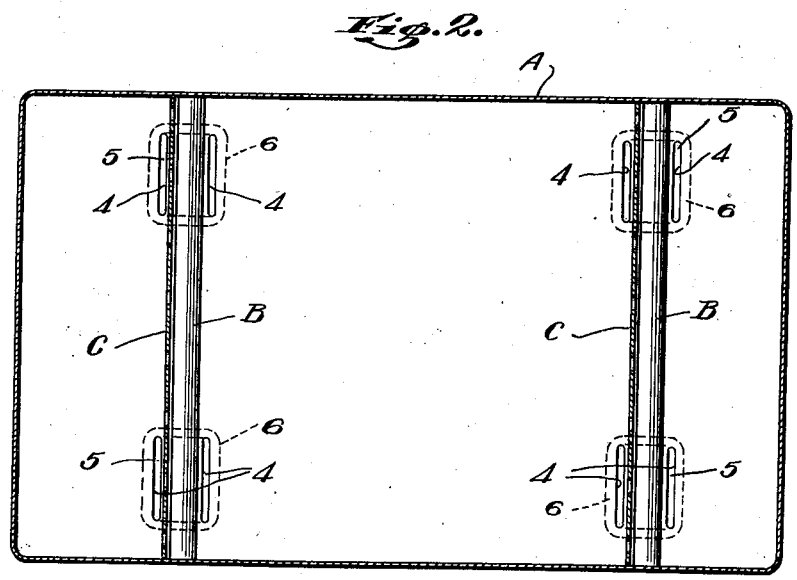
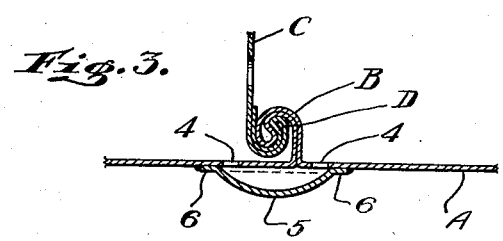
INVENTOR
PHILIP J. BILLIG
BY
ATTORNEY Patented Mar. 26, 1940

2,195,074

UNITED STATES PATENT OFFICE 2,195,074

FUEL TANK FOR AIRPLANES

Philip J. Billig, Brooklyn, N. Y., assignor to Breeze Corporations, Inc., Newark, N. J.

Application February 8, 1937, Serial No. 124,616

2 Claims. (Cl. 220—22)

This invention relates to fuel tanks for airplanes.

The object of the invention is to provide a means in fuel tanks for airplanes whereby there is no accumulation of liquid fuel in one section of a fuel tank to the exclusion of other sections. In other words, to provide a means whereby the liquid fuel is evenly distributed at all times in the tank.

In modern fuel tank construction, such as is shown in Patent No. 2,134,678, dated October 25, 1938, the tank comprises an outer shell A in the wall of which is formed a hooked channel B adapted to co-operate with a partition C, the edges of which are also bent to form complementary hooked portions D to co-operate with the hooked portions B of the tank body. In such construction a body of gasoline may form between the partition and end of the tank, or between succeeding partitions, and the object of the invention is to prevent the forming of such a body of gasoline and to provide means whereby gasoline may freely flow from one end to the other of the tank A.

The invention consists of the construction, combination and arrangement of parts, as herein illustrated, described and claimed.

In the accompanying drawing, forming part hereof, is illustrated an embodiment of the invention, in which drawing similar reference characters designate corresponding parts, and in which:

Figure 1 is a longitudinal vertical section;

Figure 2 is a horizontal section taken approximately on line 2—2 of Figure 1; and Figure 3 is a fragmentary detail in enlarged vertical section.

Referring to the drawing, 4 designates slots or openings formed through the shell of the tank A at opposite sides to the hooked channel B formed as a part of the shell of the tank.

Covering the slots 4 is a cup-shaped or curved plate 5 in each instance. The plates 5 are provided with flanges 6 which may be welded to the outer surface of the tank A so that gasoline may readily flow through the slots 4, and prevent any accumulation of gasoline either between any pair of hooked channel members B, or between said members and the end of the tank.

It should be understood that the number of hooked channel members B and the number of slots 4 and plates 5 will be multiplied as may be necessary for any particular size or conformation of tank A.

Having thus fully described the invention, what is claimed as new and desired to be secured by Letters Patent is:

1. An airplane fuel tank having a continuous wall formed with hooks on its inner surface and provided with slots disposed at opposite sides of the hooks, partitions disposed inside of the tanks and provided with folded portions disposed in engagement with the hooks and plates disposed on the outside of the tank at points to permit bridging of the pairs of the slots and provided with peripheral flanges to permit welding to the tank.

2. An airplane fuel tank, having a plurality of compartments formed by closed partitions disposed at spaced intervals across the internal diameter of the tank, said tank having a continuous outer wall and hooked internal connections between said wall and said partitions, openings in said outer wall disposed on each side of said partitions and plates disposed over said openings in spaced relation to said wall, the edges of such plates being secured and sealed to said wall around said openings, whereby the contents of the tank may flow between one compartment and another.

PHILIP J. BILLIG.